United States Patent
Tsuchimochi

(10) Patent No.: US 10,497,222 B2
(45) Date of Patent: Dec. 3, 2019

(54) PRODUCT REGISTRATION APPARATUS, PROGRAM, AND CONTROL METHOD

(71) Applicant: NEC CORPORATION, Tokyo (JP)

(72) Inventor: Kazuki Tsuchimochi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 114 days.

(21) Appl. No.: 15/559,989

(22) PCT Filed: Mar. 22, 2016

(86) PCT No.: PCT/JP2016/058943
§ 371 (c)(1),
(2) Date: Sep. 20, 2017

(87) PCT Pub. No.: WO2016/152838
PCT Pub. Date: Sep. 29, 2016

(65) Prior Publication Data
US 2018/0068533 A1    Mar. 8, 2018

(30) Foreign Application Priority Data
Mar. 23, 2015 (JP) ................. 2015-060188

(51) Int. Cl.
*G07G 1/00* (2006.01)
*G06K 9/03* (2006.01)
(Continued)

(52) U.S. Cl.
CPC ....... *G07G 1/0063* (2013.01); *G06K 7/10722* (2013.01); *G06K 7/14* (2013.01);
(Continued)

(58) Field of Classification Search
CPC .. G06K 9/033; G06K 9/6201; G06K 2209/17; G06T 2207/30128;
(Continued)

(56) References Cited

U.S. PATENT DOCUMENTS 9,563,886 B1 * 2/2017 Catoe et al. ......... G06Q 20/208
9,892,438 B1 * 2/2018 Kundu et al. ...... G06Q 30/0609
(Continued)

FOREIGN PATENT DOCUMENTS

| CN | 1230270 A | 9/1999 |
|---|---|---|
| CN | 101268478 A | 9/2008 |

(Continued)

OTHER PUBLICATIONS

Machine translation of JP 2007-206996 A (published in Japanese on Aug. 16, 2007).*

(Continued)

*Primary Examiner* — Andrew W Johns
(74) *Attorney, Agent, or Firm* — Sughrue Mion, PLLC

(57) ABSTRACT

A product registration apparatus (2000) includes a recognition unit (2020), an imaging unit (2040), a detection unit (2060), and a determination unit (2080). The recognition unit (2020) recognizes a product. The imaging unit (2040) images an action of a customer to generate a customer image. The detection unit (2060) uses the customer image to detect that a product is disposed in a detection target area. The detection target area is a space including an area in which a product is recognized by the recognition unit (2020). The determination unit (2080) determines whether or not a product is recognized by the recognition unit (2020) in a case where it is detected that a product is disposed in the detection target area.

13 Claims, 12 Drawing Sheets

(51) Int. Cl.
G07G 1/12 (2006.01)
G06K 7/14 (2006.01)
G06K 9/62 (2006.01)
G06K 7/10 (2006.01)
G06Q 20/20 (2012.01)
G06K 9/32 (2006.01)

(52) U.S. Cl.
CPC .............. *G06K 9/033* (2013.01); *G06K 9/32* (2013.01); *G06K 9/6201* (2013.01); *G06Q 20/208* (2013.01); *G07G 1/12* (2013.01); *G06K 2209/17* (2013.01); *G06K 2209/19* (2013.01)

(58) Field of Classification Search
CPC .. G06Q 20/208; G07G 1/0009; G07G 1/0036; G07G 1/0063; G07G 1/12
See application file for complete search history.

(56) References Cited

U.S. PATENT DOCUMENTS

| | | | | |
|---|---|---|---|---|
| 10,192,208 | B1* | 1/2019 | Catoe et al. | G06Q 20/204 |
| 2013/0182899 | A1 | 7/2013 | Naito et al. | G06K 9/6201 |
| 2015/0046277 | A1* | 2/2015 | Fukuda | G06Q 20/208 |
| | | | | 705/23 |
| 2016/0203499 | A1* | 7/2016 | Yamashita et al. | G06Q 30/02 |
| | | | | 705/7.29 |

FOREIGN PATENT DOCUMENTS

| | | | | |
|---|---|---|---|---|
| CN | 103208154 A | 7/2013 | | |
| JP | 7141569 A | 6/1995 | ............... | G07G 1/12 |
| JP | 2007-206996 A | 8/2007 | ............... | G07G 1/12 |
| JP | 2010044479 A | 2/2010 | ............... | G07G 1/00 |
| JP | 2011-054038 A | 3/2011 | ............... | G07G 1/12 |
| JP | 2013-145526 A | 7/2013 | ............... | G07G 1/00 |
| JP | 2014-132501 A | 7/2014 | ............... | G07G 1/01 |

OTHER PUBLICATIONS

Machine translation of JP 2014-132501 A (published in Japanese on Jul. 17, 2014).*
International Search Report for PCT/JP2016/058943 dated Jun. 21, 2016 [PCT/ISA/210].
Written Opinion for PCT/JP2016/058943 dated Jun. 21, 2016 [PCT/ISA/237].
Communication dated Apr. 2, 2019, from Japanese Patent Office in counterpart application No. 2015-060188.
Communication dated Jun. 20, 2019, from the State Intellectual Property Office of the P.R.C in application No. 201680017463.6.

* cited by examiner

PRODUCT REGISTRATION APPARATUS, PROGRAM, AND CONTROL METHOD

CROSS REFERENCE TO RELATED APPLICATIONS

This application is a National Stage of International Application No. PCT/JP2016/058943 filed Mar. 22, 2016, claiming priority based on Japanese Patent Application No. 2015-060188 filed Mar. 23, 2015, the contents of all of which are incorporated herein by reference in their entirety.

TECHNICAL FIELD

The present invention relates to a product registration apparatus, a program, and a control method.

BACKGROUND ART

In stores such as a supermarket, a registration terminal operated by a customer for himself (or herself) is beginning to be in practical use. A customer causes a registration terminal to read a bar code or the like attached to a product to be purchased, and thus performs registration of the product to be purchased. Thereafter, the customer purchases the registered product by inserting money displayed on a screen into a registration terminal.

There is Patent Document 1 as an example of a document disclosing a technique relevant to such a registration terminal. Patent Document 1 discloses an invention with which it is confirmed that a product is scanned. Specifically, the invention of Patent Document 1 detects that (1) a product is extracted from a shopping basket and that (2) a product is took into a storage bag. Further, this invention gives notice of an error warning in a case where a product is not scanned between (1) and (2).

RELATED DOCUMENT

Patent Document

[Patent Document 1] Japanese Unexamined Patent Publication No. 2011-54038

SUMMARY OF THE INVENTION

Technical Problem

In a registration terminal operated by a customer for himself (or herself), the registration of a product may not be correctly performed. For example, it may occur that a customer holds a product over the bar code reader of a registration terminal, but the registration of the product is not performed due to malfunction of the bar code reader or the like. In a case where some products are not registered due to an error when a plurality of products are purchased, there is a possibility for a customer not to be aware that some products are not registered. As a result, the customer unduly takes out the products unintentionally, and thus there may be a concern of leading to trouble between the customer and the store.

Here, the aforementioned technique of Patent Document 1 is premised on the use of a shopping basket and a registration bag. Therefore, the invention of Patent Document 1 is not able to be used in small-scale stores in which a shopping basket or a storage bag is not prepared. In addition, generally, a customer often does not use a shopping basket or a storage bag in a case where the number of products to be purchased is small. In such a case, the invention of Patent Document 1 is not able to be used.

The present invention is contrived in view of the above problem. An object of the present invention is to provide a technique capable of confirming that a product is recognized in an apparatus that registers a product to be purchased.

Solution to Problem

According to the present invention, there is provided a product registration apparatus including: a recognition unit that recognizes a product; an imaging unit that captures an image of a customer's action to generate an image; a detection unit that uses the image generated by the imaging unit to detect that a product is disposed in an area which is a target for detection including a recognition area that is an area in which the product is recognized by the recognition unit; and a determination unit that performs a determination process of determining whether a product is recognized by the recognition unit, in a case where it is detected by the detection unit that a product is disposed in the area which is a target for detection.

According to the present invention, there is provided a program for operating a computer as the product registration apparatus of the present invention.

According to the present invention, there is provided a control method which is executed by a computer, the method including: a recognition step of recognizing a product; an imaging step of capturing an image of a customer's action to generate an image; a detection step of using the image generated in the imaging step to detect that a product is disposed in an area which is a target for detection including a recognition area that is an area in which the product is recognized in the recognition step; and a determination step of performing a determination process of determining whether a product is recognized in the recognition step, in a case where it is detected in the detection step that a product is disposed in the area which is a target for detection.

Advantageous Effects of Invention

In an apparatus that registers a product to be purchased, a technique capable of confirming that the product is recognized is provided.

BRIEF DESCRIPTION OF THE DRAWINGS

The above and other objects, features and advantages will be made clearer from certain preferred example embodiments described below, and the following accompanying drawings.

DESCRIPTION OF EMBODIMENTS

Figure 1:
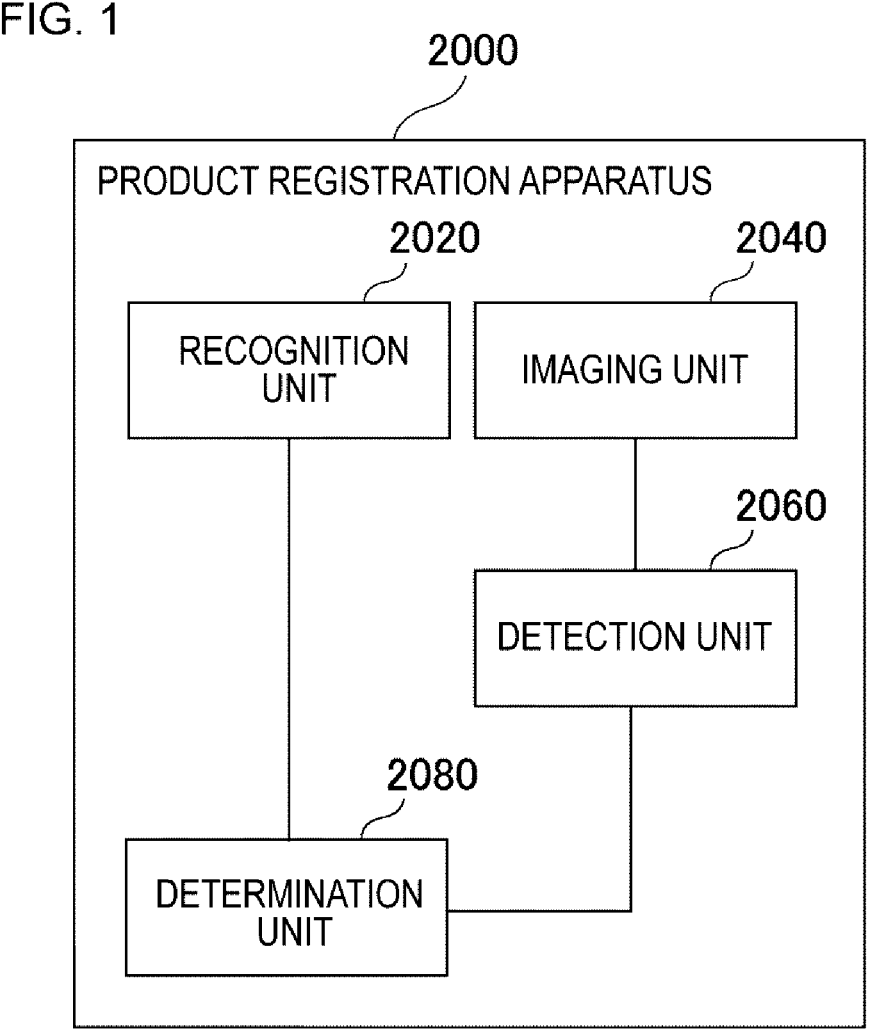
FIG. 1 is a block diagram illustrating a product registration apparatus of Example Embodiment 1.

Hereinafter, example embodiments of the present invention will be described with reference to the accompanying drawings. In all the drawings, like elements are referenced by like reference numerals and the descriptions thereof will not be repeated.

Example Embodiment 1

FIG. 1 is a block diagram illustrating a product registration apparatus 2000 of Example Embodiment 1. In FIG. 1, each block represents a function-based block rather than a hardware-based configuration.

The product registration apparatus 2000 includes a recognition unit 2020, an imaging unit 2040, a detection unit 2060, and a determination unit 2080. The recognition unit 2020 recognizes a product. The imaging unit 2040 images an action of a customer to generate an image. Hereinafter, the image generated by the imaging unit 2040 is denoted by a customer image. The detection unit 2060 uses a customer image to detect that a product is disposed in a detection target area. The detection target area is a space including an area (hereinafter, recognition area) in which a product is recognized by the recognition unit 2020. In a case where it is detected that a product is disposed in the detection target area, the determination unit 2080 determines whether or not the product is recognized by the recognition unit 2020.

Figure 2:
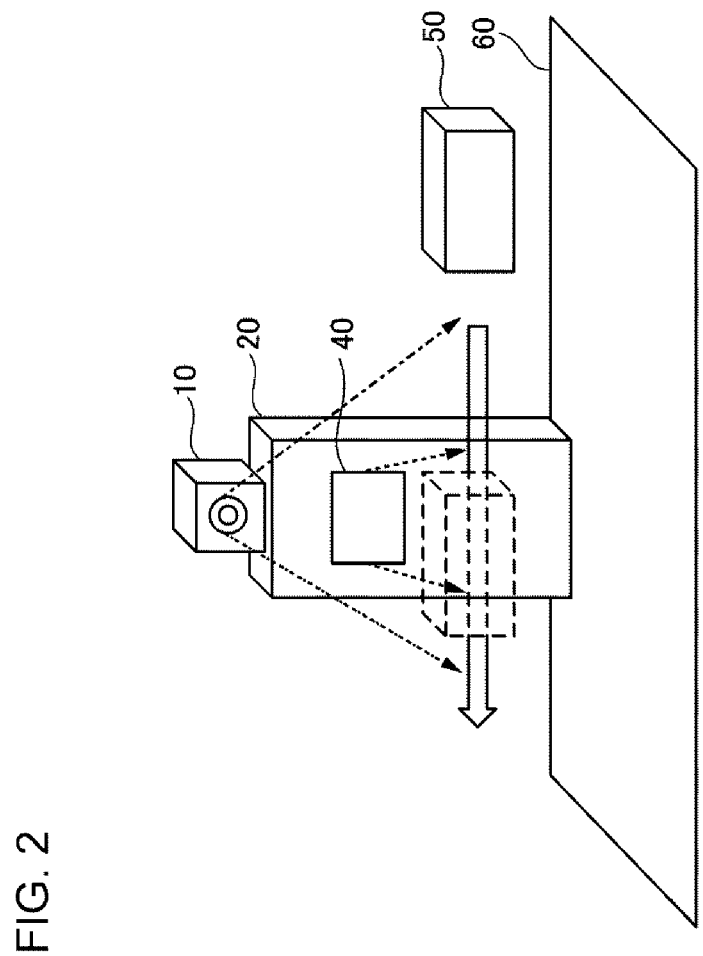
FIG. 2 is a diagram specifically illustrating the product registration apparatus.

FIG. 2 is a diagram concretely illustrating the product registration apparatus 2000. A camera 10 illustrates a camera that is an embodiment of the imaging unit 2040. A housing 20 illustrates a housing of a reader 40. The reader 40 illustrates a bar code reader that is an embodiment of the recognition unit 2020. The reader 40 reads a bar code attached to a product 50, and thereby recognizing the product 50. The product recognized by the reader 40 is registered as a product to be paid. A stand 60 illustrates a stand for placing a product or a product basket. Note that the camera 10 may be housed in the housing 20.

Figure 3:
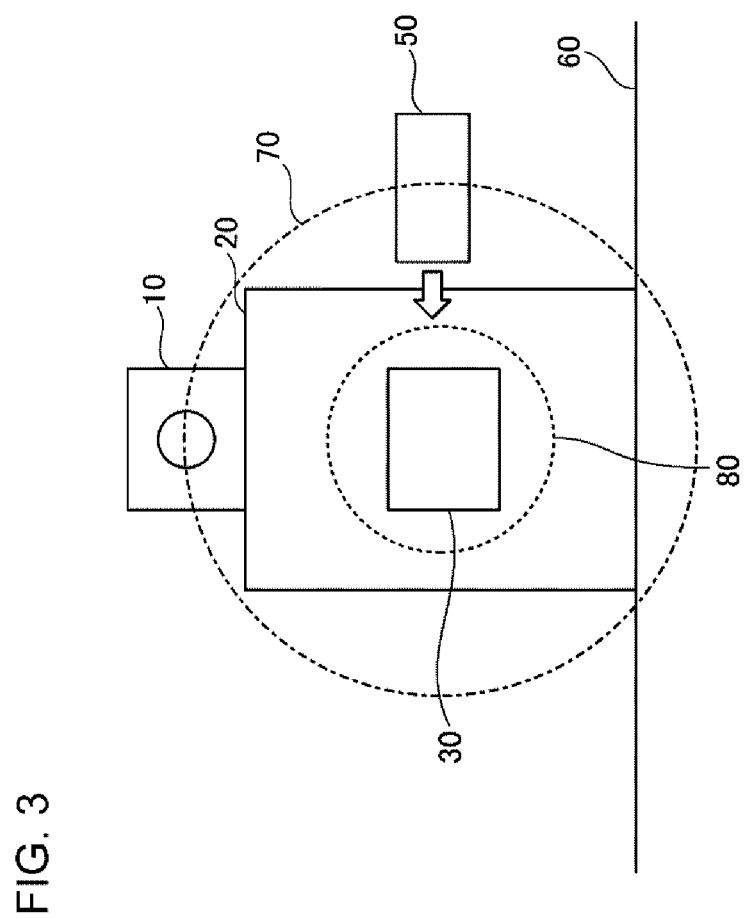
FIG. 3 is a diagram illustrating the product registration apparatus seen from the front.

FIG. 3 is a diagram illustrating the product registration apparatus 2000 seen from the front. A detection target area 70 illustrates the above-mentioned detection target area. A recognition area 80 illustrates a space in which the reader 40 can recognize a product (can read a bar code). As described above, the detection target area 70 includes the recognition area 80. For example, as shown in FIG. 3, the detection target area 70 includes the housing 20 entirely when seen from the front.

The detection unit 2060 uses a customer image generated by the camera 10 in order to detect that the product 50 is disposed in the detection target area 70. In a case where this detection is performed, the determination unit 2080 determines whether or not the product 50 is recognized (whether or not the bar code of the product 50 is read).

Note that, as described later, a method in which the recognition unit 2020 recognizes a product is not limited to a method of reading a bar code attached to the product.

<Advantageous Effect>

In a case where a product passes outside the recognition area of the recognition unit 2020 due to a customer's mistake in operation or the like, the product is not recognized by the recognition unit 2020. In addition, it may occur that a product is not recognized by the recognition unit 2020 due to an operation error of the recognition unit 2020 or the like. In these cases, a customer does not pay the price of the product that is not recognized, and thus there may be a concern of trouble occurring between the customer and a store.

Thus, the product registration apparatus 2000 of the present example embodiment detects that a product is disposed in the detection target area in which the recognition area of the recognition unit 2020 is included. In this manner, it is possible to detect that a product has passed through the recognition area of the recognition unit 2020 and the vicinity thereof.

Further, the product registration apparatus 2000 detects that a product is disposed in the detection target area, and then determines whether or not the product is recognized by the recognition unit 2020. In a case where a product is not recognized by the recognition unit 2020, it means that the product is not recognized in spite of the product having passed through the recognition area of the recognition unit 2020 or the vicinity thereof. Therefore, in such a case, there is the possibility of the customer's mistake in operation or the operation error of the recognition unit 2020 stated above being caused.

According to the product registration apparatus 2000 of the present example embodiment, it is possible to recognize a situation in which there is the possibility of the customer's mistake in operation, the operation error of the recognition unit 2020, or the like being caused in this manner. Therefore, it is possible to avoid a trouble between the customer and a salesclerk.

Further, according to the product registration apparatus 2000 of the present example embodiment, the determination of whether a product is recognized is performed in accordance with the detection of the product being disposed in the detection target area. Therefore, even in a situation where a shopping basket or a storage bag is not used, it is able to confirm whether the product is recognized by the product registration apparatus 2000.

Hereinafter, the product registration apparatus 2000 of the present example embodiment will be described in more detail.

<Flow of Processes>

Figure 4:
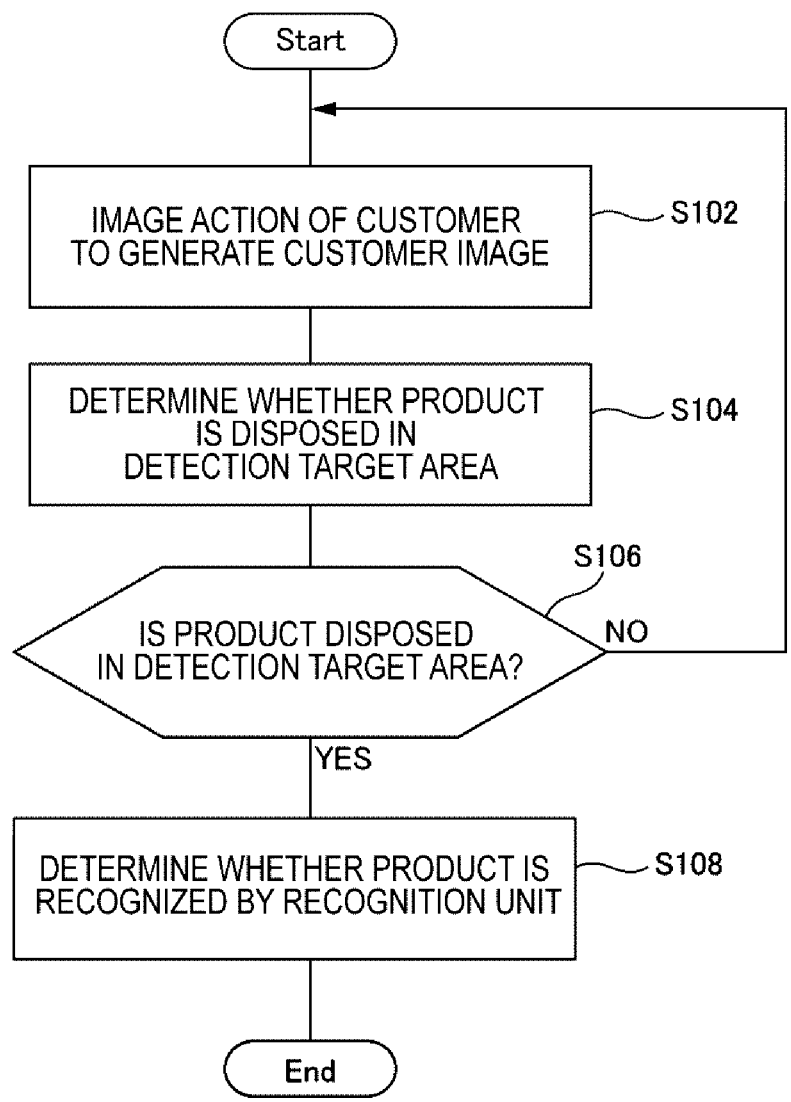
FIG. 4 is a flow diagram illustrating a flow of processes executed by the product registration apparatus of Example Embodiment 1.

FIG. 4 is a flow diagram illustrating a flow of processes executed by the product registration apparatus 2000 of Example Embodiment 1. The imaging unit 2040 images an action of a customer to generate a customer image (S102). The detection unit 2060 uses the customer image to determine whether or not a product is disposed within the detection target area (S104). In a case where a product is not disposed within the detection target area (S106: NO), the process of FIG. 4 returns to S102. On the other hand, in a case where a product is disposed within the detection target area (S106: YES), the process of FIG. 4 proceeds to S108.

In S108, the determination unit 2080 determines whether or not a product is recognized by the recognition unit 2020.

<Hardware Configuration Example>

The product registration apparatus 2000 may be realized only by hardware (such as, for example, hard-wired electronic circuits), or may be realized by a combination of hardware and software (such as, for example, a combination of electronic circuits and programs for controlling the circuits).

The product registration apparatus 2000 is implemented using a special-purpose terminal such as, for example, a registration terminal. However, the product registration apparatus 2000 may be implemented using various general-purpose computers such as a personal computer (PC) or a server machine rather than such a special-purpose terminal.

Figure 5:
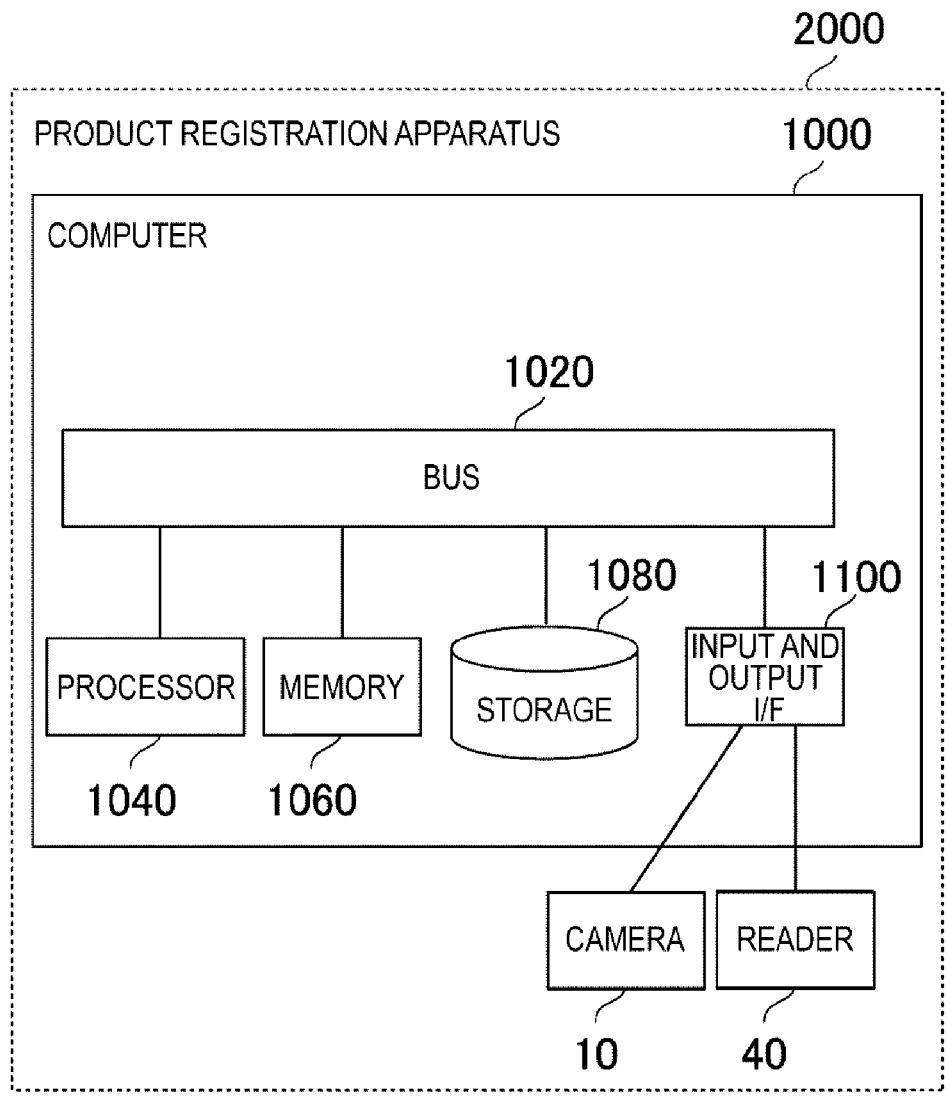
FIG. 5 is a block diagram illustrating a hardware configuration of a computer used to implement the product registration apparatus.

FIG. 5 is a block diagram illustrating a hardware configuration of a computer 1000 used to implement the product registration apparatus 2000. The computer 1000 includes a bus 1020, a processor 1040, a memory 1060, a storage 1080, and an input and output interface 1100. The bus 1020 is a data transmission channel in order for the processor 1040, the memory 1060, the storage 1080, and the input and output interface 1100 to mutually transmit and receive data. However, a method of connecting the processor 1040 and the like to each other is not limited to a bus connection. The processor 1040 is an arithmetic processing apparatus such as, for example, a central processing unit (CPU) or a graphics processing unit (GPU). The memory 1060 is a memory such as, for example, a random access memory (RAM) or a read only memory (ROM). The storage 1080 is a storage device such as, for example, a hard disk, a solid state drive (SSD), or a memory card. In addition, the storage 1080 may be a memory such as a RAM or a ROM.

The input and output interface 1100 is an interface for connecting the computer 1000 to an input and output device. The computer 1000 is connected to the camera 10 and the reader 40 through the input and output interface 1100. The camera 10 is a camera having an imaging element for implementing the imaging unit 2040. In addition, the reader 40 is a reader for implementing the recognition unit 2020. However, as described later, the recognition unit 2020 may be implemented using the camera. Note that the camera 10 or the reader 40 may be integrated into the computer 1000. In addition, the computer 1000 is further connected to the input and output device such as a keyboard, a mouse, or a display through the input and output interface 1100.

The storage 1080 stores a program for realizing a function of the product registration apparatus 2000. Specifically, the storage 1080 stores program modules for realizing functions of the detection unit 2060 and the determination unit 2080. In addition, the storage 1080 may include a program module for controlling the camera 10 or the reader 40. The processor 1040 realizes the functions of the respective functional configuration units by executing these respective program modules. Here, when the processor 1040 executes the respective modules, these modules may be read out on the memory 1060 and then be executed, and may be executed without being read out on the memory 1060.

The hardware configuration of the computer 1000 is not limited to the configuration shown in FIG. 5. For example, each program module may be stored in the memory 1060. In this case, the computer 1000 may not include the storage 1080.

<Details of Recognition Unit 2020>

A specific method of implementing the recognition unit 2020 differs depending on a method with which the recognition unit 2020 recognizes a product. For example, the recognition unit 2020 reads a product information symbol attached to a product, thereby recognizing the product. The product information symbol is a symbol with which information relating to a product is determined. Here, the symbol refers to a bar code, a two-dimensional code (such as a QR code (Registered Trademark)), a character string symbol, or the like. Note that the character string used herein may also include a numerical sequence. The product information symbol is a bar code having information for determining product information (such as an ID of product information) encoded therein, a character string symbol indicating information for determining product information, or the like.

A specific method of implementing the recognition unit 2020 that reads a product information symbol differs depending on what is used as a product information symbol. For example, in a case where the product information symbol is a bar code, the recognition unit 2020 includes a bar code reader. In addition, for example, in a case where the product information symbol is a two-dimensional code, the recognition unit 2020 includes a two-dimensional code reader. In addition, for example, in a case where the product information symbol is a character string symbol, the recognition unit 2020 includes an imaging element that images this character string, and a processing unit that analyzes the imaged character string symbol to calculate a product ID or the like. Note that various well-known techniques relating to character string analysis can be used in the analysis of a character string symbol. A description relating to these well-known techniques will not be given.

Note that, in a case where a plurality of kinds of symbols are used as the product information symbol, the recognition unit 2020 includes a reader or the like for reading each of the plurality of kinds of symbols. For example, in a case where a bar code and a two-dimensional code are used as product information symbols, the recognition unit 2020 includes a bar code reader and a two-dimensional code reader.

The recognition unit 2020 may image a product to generate an image of the product, and recognize the product by performing object recognition on the image. In this case, the recognition unit 2020 includes an imaging element that images a product to generate an image. Here, various well-known techniques relating to object recognition can be used in a method of recognizing an imaged product. Therefore, a specific method in which the recognition unit 2020 recognizes a product from the image of the product will not be given.

<Details of Imaging Unit 2040>

The imaging unit 2040 includes an imaging element that images an action of a customer to generate a customer image. Here, the imaging unit 2040 may generate a still image or a video. In the latter case, the customer image is each frame constituting the video.

There are various timings at which the imaging unit 2040 performs imaging. For example, the imaging unit 2040 may repeatedly perform imaging. A frequency at which the imaging unit 2040 repeatedly performs the imaging is, for example, 1/30 second that is the same as the frame rate of a general video.

In addition, for example, the imaging unit 2040 may perform imaging only at timing of a customer's action being performed and before or after that. For example, an infrared sensor or the like that performs the detection of a person is provided in the vicinity of the recognition unit 2020. The imaging unit 2040 receives a notification from this infrared sensor, and thereby recognizing that a customer is located in the vicinity of the recognition unit 2020. Thus, for example, the imaging unit 2040 performs imaging from when this infrared sensor detects that a customer is located in the vicinity of the recognition unit 2020 until this infrared sensor does not detect the customer.

Here, suppose that the recognition unit 2020 is configured to use an imaging element. For example, the aforementioned two-dimensional code reader includes an imaging element that images a two-dimensional code. In addition, even in a case where the recognition unit 2020 performs object recognition, the recognition unit 2020 includes an imaging element. In this case, the resolution of the imaging element of the imaging unit 2040 may be lower than the resolution of the imaging element of the recognition unit 2020. This is because the resolution of an image required for detecting whether or not a product exists within the detection target area is lower than the resolution of an image required for detecting a product information symbol such as a two-dimensional code, or recognizing a product through object recognition. By lowering the resolution of the imaging element of the imaging unit 2040 in this manner, it is possible to reduce the manufacturing cost of the product registration apparatus 2000. However, the resolution of the imaging element of the imaging unit 2040 may be equal to or higher than the resolution of the imaging element of the recognition unit 2020.

In addition, in a case where the recognition unit 2020 images a product to recognize the product, the recognition unit 2020 may be provided integrally with the imaging unit 2040. For example, in this case, the recognition unit 2020 and the imaging unit 2040 are implemented using one camera or the like. In addition, the recognition unit 2020 and the imaging unit 2040 may be implemented using different cameras or the like, and be housed in the same housing.

<Details of Detection Unit 2060>

The detection unit 2060 analyzes a customer image (S104 of FIG. 4). Specifically, the detection unit 2060 analyzes the customer image, and thus performs a process (hereinafter, detection process) of detecting that a product is disposed within the detection target area.

<<Details of Detection Process>>

The detection target area is, for example, an imaging range of the imaging unit 2040. In this case, the detection target area equals to the entire range imaged in a customer image. Thus, in a case where a product is imaged in the customer image, the detection unit 2060 determines that the product is disposed within the detection target area. Note that various well-known techniques for detecting a predetermined object from an image can be used in the determination of whether or not a product is imaged within the image. A description relating to these well-known techniques will not be given.

The detection target area may be a portion of the imaging range of the imaging unit 2040. For example, a lens included in the imaging unit 2040 for the purpose of imaging is a lens with which imaged scenery gets distorted with increasing distance from the center, such as a wide-angle lens. In this case, since an object imaged in a range greatly distant from the center gets greatly distorted, it is difficult to determine whether or not the object is a product. Thus, in such a case or the like, the detection target area may be limited to a predetermined range from the center of the customer image. The detection unit 2060 analyzes a portion in this predetermined range within the customer image, and then determines whether or not a product imaged within the predetermined range. In a case where a product is imaged within this predetermined range, the imaging unit 2040 determines that the product is disposed within the detection target area.

A configuration relating to "what range is configured to be the detection target area" may be established in advance in the detection unit 2060, and may be stored in a storage unit provided inside or outside the product registration apparatus 2000. In the latter case, the detection unit 2060 reads out the configuration from this storage unit.

In a case where the imaging unit 2040 repeatedly performs imaging, the same product may be imaged in a plurality of customer images multiple times. In such a case, the detection unit 2060 is required to be capable of recognizing that products imaged in a plurality of customer images are the same product. Otherwise, for example, in a case where a scene of a customer causing the recognition unit 2020 to recognize a certain product is imaged two times, the detection unit 2060 performs the detection of "the product is disposed in the detection target area" two times.

Thus, in a case where a certain product is imaged in a plurality of customer images in accordance with a series of actions of a customer, the detection unit 2060 handles the plurality of customer images as a group of customer images. The detection unit 2060 performs the detection of "a product is disposed at a detection target" only once, with respect to the group of customer images.

The series of actions of a customer refer to a series of actions of "moving a product close to the recognition unit 2020, causing it to be recognized by the recognition unit 2020, and moving the product away from the recognition unit 2020". For example, this action is an action of moving a product so that the product traverses the front of the recognition unit 2020, or the like. Note that the series of actions of a customer may be actions for traversing the product in the moving direction of the customer, or may be actions for traversing a product in the direction opposite thereof.

The above-described "group of customer images" will be explained. When a customer causes the recognition unit 2020 to recognize a product, there occur two changes: "a certain product enters the detection target area" and "the product comes out of the detection target area". Thus, the detection unit 2060 handles a customer image in which a certain product is initially imaged within the detection target area, among a plurality of customer images generated in a time-series manner, as the first customer image included in a group of customer images. In addition, the detection unit 2060 handles a customer image that is generated after the first customer image, and that is the last one in which the product is imaged in the detection target area (the customer image that is one before the customer image in which the product first becomes not being imaged within the detection target area), as the second customer image included in the group of customer images. The detection unit 2060 handles the first customer image, the second customer image, and a set of customer images each of which is imaged at a point in time between points in time of imaging of these images, as a group of customer images.

There are various timings at which the detection unit 2060 performs a detection process. For example, whenever a customer image is generated, the detection unit 2060 performs the detection process using the customer image. In this case, all the customer images generated by the imaging unit 2040 are used in the detection process.

In addition, for example, the detection unit 2060 may perform the detection process only at a time between when the aforementioned infrared sensor or the like detects that a customer is located in the vicinity of the product registration apparatus 2000 and when the infrared sensor or the like becomes not detecting the customer. In this case, only customer images generated at a time between when it is detected that the customer is located in the vicinity of the product registration apparatus 2000 and when the infrared sensor or the like becomes not detecting the customer is used in the detection process, among the customer images generated by the imaging unit 2040.

As described above, the detection target area is required to be a region including the recognition area (the area in which the recognition unit 2020 recognizes a product). In order for this requirement being satisfied, a manager or the like of the product registration apparatus 2000 performs a configuration of the recognition unit 2020, the imaging unit 2040, or the detection unit 2060 in advance, or appropriately selects hardware constituting these units.

For example, the manager or the like appropriately configures the direction of installation of the recognition unit 2020 or the imaging unit 2040. Specifically, the manager or the like appropriately configures the direction of a reader or the like constituting the recognition unit 2020, the direction of a camera or the like constituting the imaging unit 2040, or both these directions, and thus the recognition area becomes included in the detection target area.

In addition, for example, the manager or the like appropriately selects a reader or a camera that is used for implementing the recognition unit 2020 and the imaging unit 2040, so that a range in which the reader or the like constituting the recognition unit 2020 reads the product information symbol becomes smaller than the angle of view of the camera or the like constituting the imaging unit 2040.

In addition, for example, in a case where the recognition unit 2020 recognizes an imaged product, the manager or the like appropriately configures the range in images analyzed in order for the recognition unit 2020 to recognize the product, the detection target area configured in the detection unit 2060, or the both, so that the recognition area is included in the detection target area.

<Details of Determination Unit 2080>

The determination unit 2080 performs a determination on the basis of the result of recognition performed by the recognition unit 2020 and the result of detection performed by the detection unit 2060. For example, the determination unit 2080 performs any of the following determination processes.

<<Determination Process 1>>

The determination unit 2080 determines whether or not a product is recognized by the recognition unit 2020 within a predetermined time from when it is detected that a product is disposed within the detection target area. In a case where the product is recognized by the recognition unit 2020 within the predetermined time, the determination unit 2080 determines that "a product is recognized by the recognition unit 2020 after it is detected that a product is disposed within the detection target area". On the other hand, in a case where a product is not recognized by the recognition unit 2020 within the predetermined time, the determination unit 2080 determines that "a product is not recognized by the recognition unit 2020 in a case where it is detected that a product is disposed within the detection target area". Note that the predetermined time is, for example, 0.5 seconds.

Normally, the product disposed within the detection target area is recognized by the recognition unit 2020 immediately after that. Therefore, in a case where a product is not recognized even after a predetermined time, e.g. 0.5 seconds, has elapsed in spite of being disposed within the detection target area, it is possible that the customer's mistake in operation, the operation error of the recognition unit 2020, or the like described above occur. Thus, the determination unit 2080 determines that "a product is not recognized" in such a case.

<<Determination Process 2>>

In addition, for example, the determination unit 2080 determines whether or not a product is not recognized by the recognition unit 2020 in a period after it is detected that the product is disposed within the detection target area and before it is detected that a product is disposed again within the detection target area. In a case where the product is recognized in the period, the determination unit 2080 determines that "a product is recognized by the recognition unit 2020 in a case where it is detected that a product is disposed within the detection target area". On the other hand, in a case where the product is not recognized in the period, the determination unit 2080 determines that "a product is not recognized by the recognition unit 2020 in a case where it is detected that a product is disposed within the detection target area".

In a case where a plurality of products are purchased, for example, a customer causes the recognition unit 2020 to recognize the respective products in order. Therefore, in a case where a certain product is disposed within the detection target area, the product is recognized by the recognition unit 2020, and then the next product is disposed within the detection target area. Thus, in a case where a product is not recognized by the recognition unit 2020 after a certain product is disposed in the detection target area and before the next product is disposed within the detection target area, it is possible that the customer's mistake in operation, the operation error of the recognition unit 2020, or the like described above occur. Thus, the determination unit 2080 determines that "a product is not recognized" in such a case.

<<Others>>

There are various methods with which the determination unit 2080 recognizes that a product is recognized by the recognition unit 2020. For example, when a product is recognized, the recognition unit 2020 transmits a signal to the determination unit 2080. The determination unit 2080 receives this signal, and thus recognizes that a product is recognized.

In addition, for example, suppose that the recognition unit 2020 writes the recognized information or the like into a storage unit. In this case, the determination unit 2080 accesses this storage unit to determine whether or not the information recognized by the recognition unit 2020 is stored, and thus determines whether or not a product is recognized by the recognition unit 2020.

The determination unit 2080 performs the determination of whether or not a product is recognized in "a case where the product is disposed in the detection target area". To do so, the determination unit 2080 recognizes a point in time at which a product is disposed in the detection target area. The point in time at which a product is disposed in the detection target area is represented by, for example, a point in time of generating a customer image in which the product is imaged. When it is detected by the determination unit 2080 that "a product is disposed in the detection target area", the determination unit 2080 acquires a point in time of generating of the customer image corresponding to the detection, and thereby recognizing a point in time at which the product is disposed in the detection target area.

Note that, in a case where the same product is imaged in a plurality of customer images as described above, for example, the detection unit 2060 handles an earliest point in time of generating the plurality of customer images, as the point in time at which the product is disposed in the detection target area.

Example Embodiment 2

Figure 6:
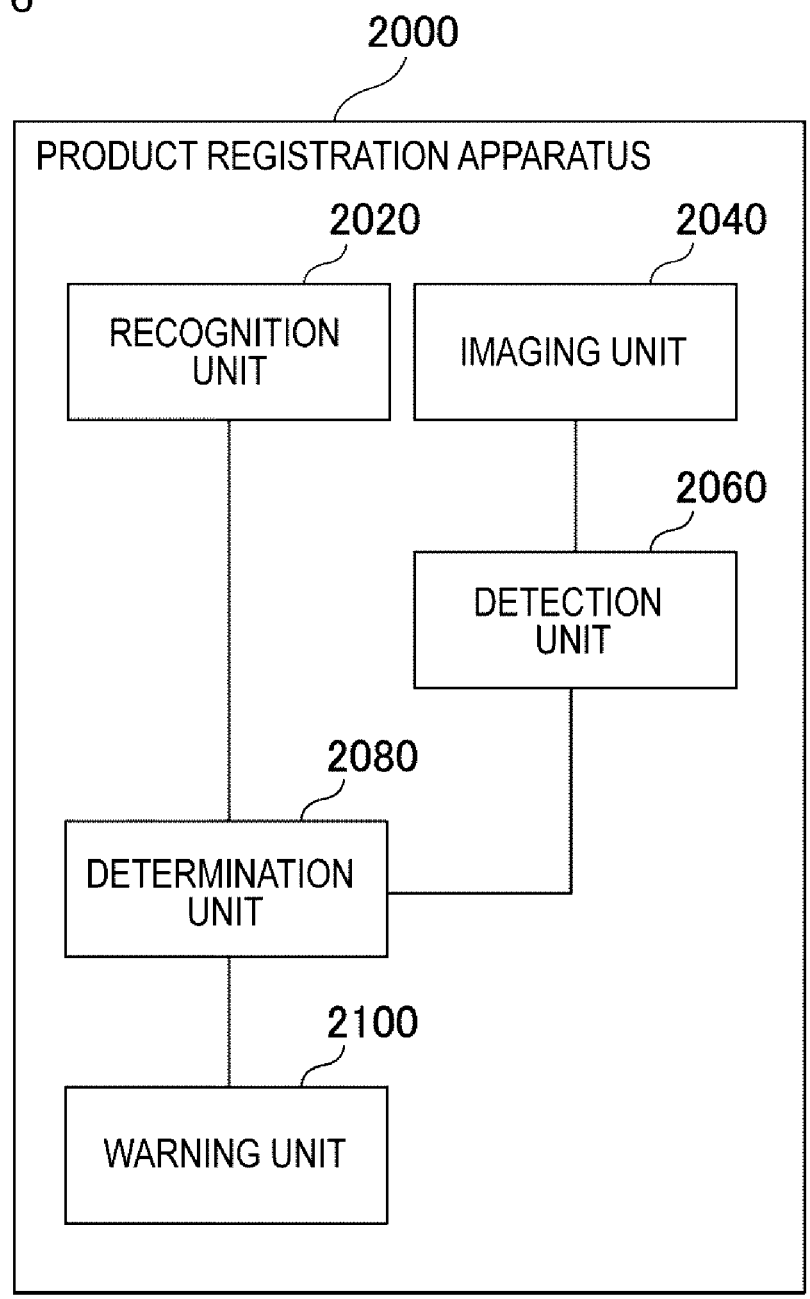
FIG. 6 is a block diagram illustrating a product registration apparatus of Example Embodiment 2.

FIG. 6 is a block diagram illustrating a product registration apparatus 2000 of Example Embodiment 2. In FIG. 6, each block represents a function-based block rather than a hardware-based configuration.

The product registration apparatus 2000 of Example Embodiment 2 includes a warning unit 2100. The warning unit 2100 performs a warning process in a case where the determination unit 2080 determines that "a product is not recognized by the recognition unit 2020 in a case where a product is disposed in the detection target area" (S202 and S204 of FIG. 7 described later).

There are various warning processes performed by the warning unit 2100. For example, a warning process performed by the warning unit 2100 is to emit an alarm sound. In this case, the product registration apparatus 2000 includes a speaker or the like that emits an alarm sound. In addition, for example, a warning process performed by the warning unit 2100 is to put on a patrol lamp. In this case, the product registration apparatus 2000 includes this patrol lamp.

In addition, for example, a warning process performed by the warning unit 2100 is a process of displaying a pop-up window or the like indicating a warning on a display connected to the product registration apparatus 2000 or a display of a terminal for a manager (such as a salesclerk). Here, the display connected to the product registration apparatus 2000 is a display for providing information such as the amount of payment to a customer.

Further, the warning unit 2100 may perform a process of causing a customer not to be able to operate the product registration apparatus 2000, as a warning process. For example, this process is a process of causing the recognition unit 2020 not to be able to recognize a product, or a process of causing the product registration apparatus 2000 not to accept an insertion of money from a customer.

<Flow of Processes>

Figure 7:
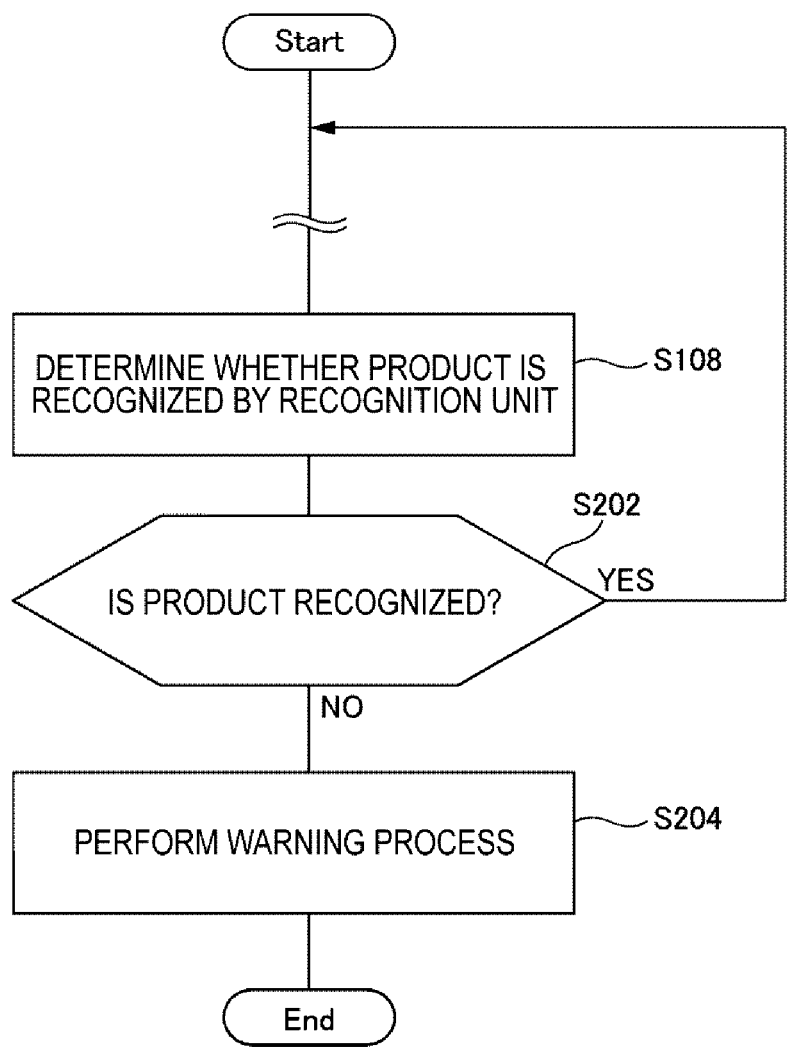
FIG. 7 is a flow diagram illustrating a flow of processes executed by the product registration apparatus of Example Embodiment 2.

FIG. 7 is a flow diagram illustrating a flow of processes executed by the product registration apparatus 2000 of Example Embodiment 2. Note that S102 to S108 are common to the process performed by the product registration apparatus 2000 of Example Embodiment 2 and the process performed by the product registration apparatus 2000 of Example Embodiment 1. Therefore, in FIG. 7, processes before S108 are not repeated.

When a product is recognized in a case where it is detected that a product is disposed in the detection target area (S202: YES), the process of FIG. 7 proceeds to S102. On the other hand, when a product is not recognized in a case where it is detected that a product is disposed in the detection target area (S202: NO), the warning unit 2100 performs a warning process (S204).

<Hardware Configuration>

For example, the product registration apparatus 2000 of Example Embodiment 2 is implemented using the computer 1000 of FIG. 5, similarly to the product registration apparatus 2000 of Example Embodiment 1. In the present example embodiment, each program module stored in the storage 1080 further includes a program for realizing each function described in the present example embodiment. In addition, the storage 1080 further stores a program module for realizing the warning unit 2100. The processor 1040 realizes a function of the warning unit 2100 by executing this program module.

<Advantageous Effect>

According to the present example embodiment, a warning is performed in a situation where "a product is not recognized by the recognition unit 2020 in a case where it is detected by the detection unit 2060 that a product is disposed in the detection target area". In this manner, since a warning is performed in a case where it is possible that the customer's mistake in operation, the operation error of the recognition unit 2020, or the like described above occurs, a salesclerk or a customer can clearly recognize such a possibility. Thus, a customer can recognize a mistake in operation and thus retry the operation. In addition, it is also possible to take a countermeasure that a salesclerk tells a customer that a product is not recognized.

Example Embodiment 3

A product registration apparatus 2000 of Example Embodiment 3 is shown in FIG. 1 similarly to the product registration apparatus 2000 of Example Embodiment 1. Except for the matters described below, the product registration apparatus 2000 of Example Embodiment 2 has the same configuration as that of the product registration apparatus 2000 of Example Embodiment 1.

Figure 8:
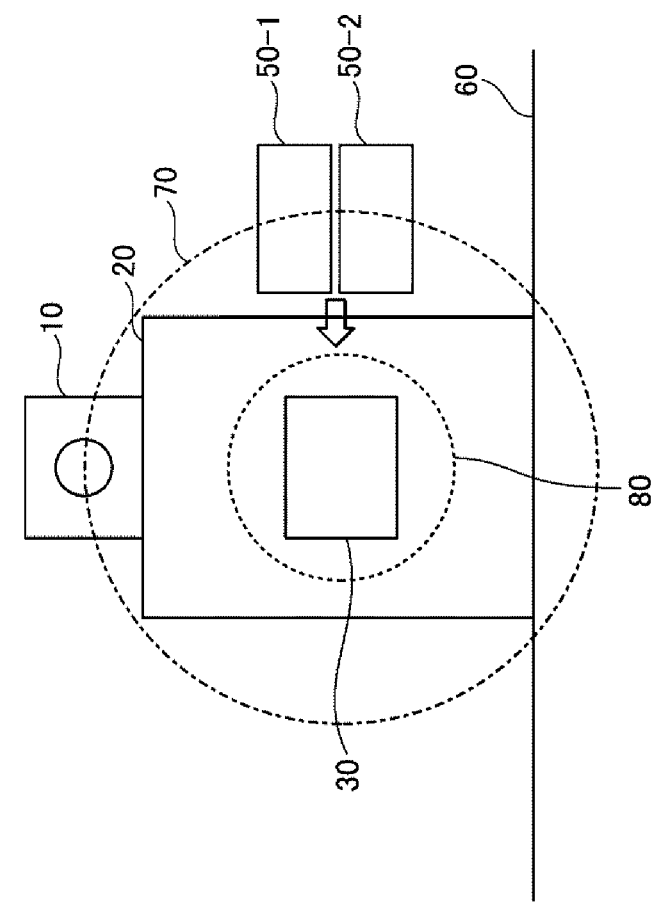
FIG. 8 is the first diagram illustrating a situation where two products are recognized by a recognition unit.

A plurality of products are sometimes recognized by the recognition unit 2020 at the same time as or at timings close to each other. FIG. 8 is the first diagram illustrating a situation where two products are recognized by the recognition unit 2020. In this case, since a product 50-1 and a product 50-2 pass through the recognition area 80 at almost the same time, these two products are recognized by the recognition unit 2020 at almost the same time.

Figure 9:
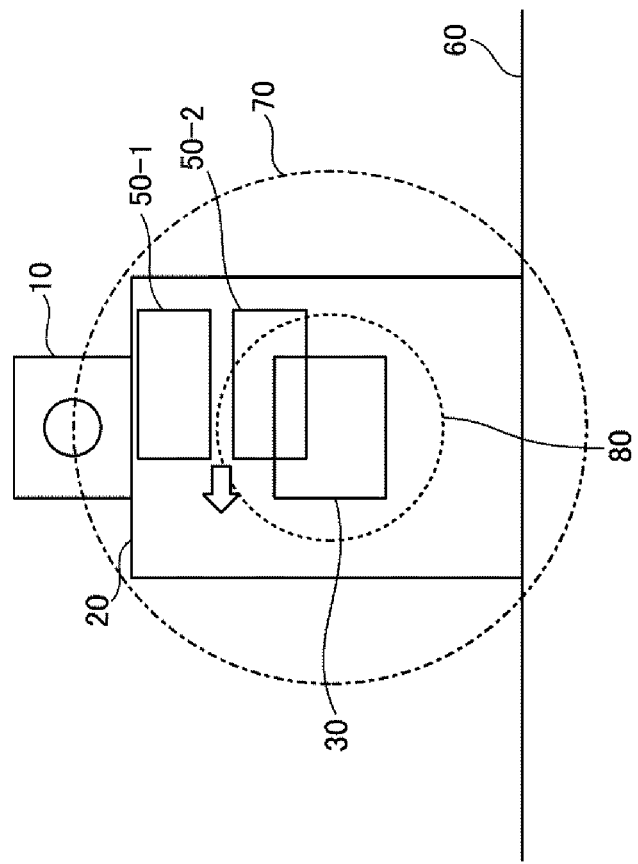
FIG. 9 is a diagram illustrating a situation where one of two products does not pass through a recognition area 80.

Here, in a case where the plurality of products are recognized by the recognition unit 2020, it is possible that a customer's mistake occurs, such as "some of products are moved so as not to pass through the recognition area of the recognition unit 2020, and thus that some of products are not recognized by the recognition unit 2020". FIG. 9 is a diagram illustrating a situation where one of two products does not pass through the recognition area 80. Specifically, the product 50-1 does not pass through the recognition area 80. Therefore, the product 50-1 is not recognized by the recognition unit 2020. In addition, a situation may also occur in which some of products are not recognized due to the operation error of the recognition unit 2020 or the like.

Thus, the determination unit 2080 of Example Embodiment 3 performs a determination in consideration of the number of products disposed within the detection target area 70. Specifically, when it is detected that products are disposed within the detection target area, the detection unit 2060 calculates the number of the products (hereinafter, product number) disposed in the detection target area (S302 of FIG. 11). In a case where it is detected by the detection unit 2060 that products are disposed within the detection target area, the determination unit 2080 determines whether or not the recognition unit 2020 recognizes products of the product number calculated by the detection unit 2060 (S304 of FIG. 11). Hereinafter, a plurality of products simultaneously disposed within the detection target area are denoted by a product group.

<Method of Calculating Number of Products>

Figure 11:
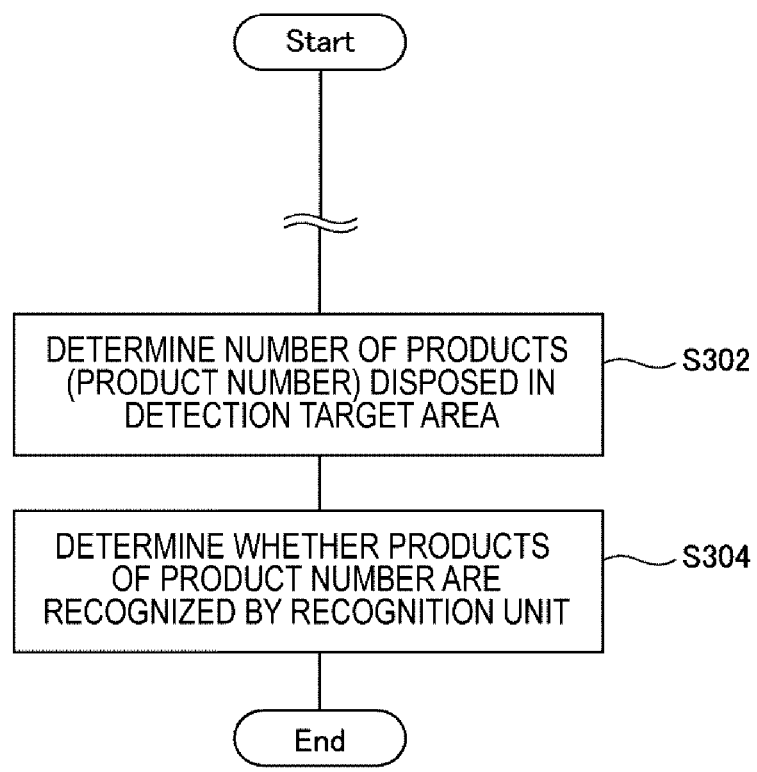
FIG. 11 is a flow diagram illustrating a flow of processes executed by a product registration apparatus of Example Embodiment 3.

As described above, when it is detected that products are disposed within the detection target area, the detection unit 2060 calculates the number of the products (S302 of FIG. 11). There are various methods in which the detection unit 2060 calculates the number of products. For example, the detection unit 2060 performs object recognition on a customer image, to thereby detect regions that represent each product of the product group. The detection unit 2060 handles the number of the detected regions as the product number. Here, various well-known techniques can be used in a method of detecting predetermined objects and calculating the number of objects by performing an object recognition process on an image. The detection unit 2060 can use such various well-known techniques. Therefore, a process in which the detection unit 2060 calculates the number of products is not limited to the exemplified process. Note that a description relating to the well-known techniques will not be given.

<Method of Detecting Product Group>

Similarly to the detection unit 2060 of Example Embodiment 1, the detection unit 2060 analyzes a customer image, to thereby detect that a product group is disposed within the detection target area.

Figure 10:
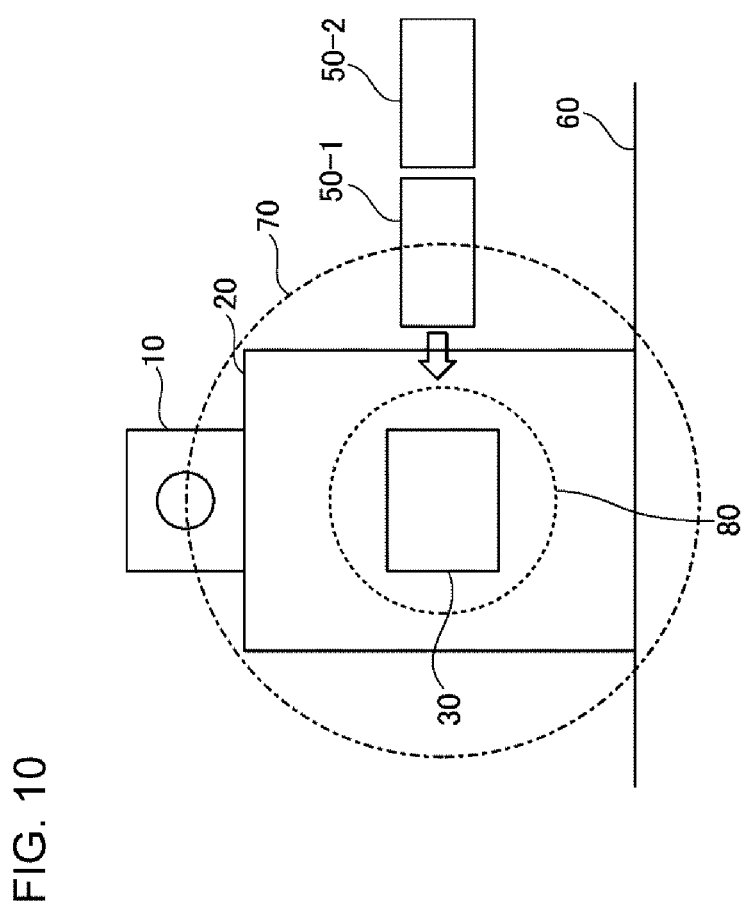
FIG. 10 is the second diagram illustrating a situation where two products are recognized by the recognition unit.

However, it is possible that respective products included in the product group enter the detection target area at different timings. FIG. 10 is the second diagram illustrating a situation where two products 50 are recognized by the recognition unit 2020. In FIG. 10, two products 50 enter the detection target area 70 at different timings. For example, such a situation as that in FIG. 10 may occur in a case where a customer causes the recognition unit 2020 to recognize each of a product in his or her left hand and a product in his or her right hand, or the like.

Thus, in a case where it is detected that a certain product is disposed within the detection target area, and then another product is disposed within the detection target area while the certain product is located within the detection target area, the detection unit 2060 handles these products as one product group. The detection unit 2060 detects that "products are disposed within the detection target area" only once, with respect to this one product group.

<Operation of Determination Unit 2080>

The determination unit 2080 performs a determination on the basis of the result of recognition performed by the recognition unit 2020 and the result of detection performed by the detection unit 2060 (S304 of FIG. 11). For example, the determination unit 2080 performs any of the following determination processes.

<<Determination Process 1>>

For example, the determination unit 2080 determines whether or not products of the product number are recognized by the recognition unit 2020 within the predetermined time from when it is detected that products are disposed within the detection target area. In a case where the products of the product number are recognized within the predetermined time, the determination unit 2080 determines that "in a case where it is detected that products are disposed within the detection target area, the products of the product number are recognized by the recognition unit 2020". On the other hand, in a case where products are not recognized within the predetermined time, or the number of products recognized within the predetermined time is less than the product number, the determination unit 2080 determines that "in a case where it is detected that products are disposed within the detection target area, the products of the product number are not recognized by the recognition unit 2020".

<<Determination Process 2>>

In addition, for example, the determination unit 2080 determines whether or not the products of the product number are recognized by the recognition unit 2020 in a period after it is detected that products are disposed within the detection target area, and before it is detected that products are disposed again within the detection target area. In a case where the products of the product number are recognized in the period, the determination unit 2080 determines that "in a case where it is detected that products are disposed within the detection target area, the products of the product number are recognized by the recognition unit 2020". On the other hand, in a case where products are not recognized in the period, or the number of products recognized in the period is less than the product number, the determination unit 2080 determines that "in a case where it is detected that products are disposed within the detection target area, the products of the product number are not recognized by the recognition unit 2020".

<Method of Determining Number of Recognized Products>

There are various methods in which the determination unit 2080 determines the number of products recognized by the recognition unit 2020. For example, in a case where the determination unit 2080 receives a signal from the recognition unit 2020 that has recognized a product, the determination unit 2080 determines that products of the same number as the number of received signals are recognized. In addition, in a case where the recognition unit 2020 stores information relating to the recognized products in a storage unit, the determination unit 2080 accesses this storage unit to check the number of pieces of the information relating to products stored in the storage unit, and thus determines the number of products recognized.

<Flow of Processes>

FIG. 11 is a flow diagram illustrating a flow of processes executed by the product registration apparatus 2000 of Example Embodiment 3. S102 to S106 are common to the process performed by the product registration apparatus 2000 of Example Embodiment 3 and the process performed by the product registration apparatus 2000 of Example Embodiment 1. Therefore, in FIG. 11, processes before S106 are not described.

The detection unit 2060 calculates the number of the products disposed in the detection target area (S302). In a case where it is detected that products are disposed in the detection target area, the determination unit 2080 determines whether or not the products of the product number are recognized by the recognition unit 2020 (S304).

<Hardware Configuration>

For example, the product registration apparatus 2000 of Example Embodiment 3 is implemented using the computer 1000 of FIG. 5, similarly to the product registration apparatus 2000 of Example Embodiment 1. In the present example embodiment, each program module stored in the storage 1080 further includes a program for realizing each function described in the present example embodiment.

<Advantageous Effect>

According to the present example embodiment, in a case where a plurality of products pass through the recognition area of the recognition unit 2020 or the vicinity thereof at the same time as or at timings close to each other, a determination considering the number of products is performed. Therefore, it is possible to recognize a situation in which "some of products are not recognized by the recognition unit 2020, among products that a customer causes the recognition unit 2020 to collectively recognize". Thus, according to the product registration apparatus 2000 of the present example embodiment, it is possible to avoid a trouble between a customer and a salesclerk more accurately than in the product registration apparatus 2000 of Example Embodiment 1.

Example Embodiment 4

A product registration apparatus 2000 of Example Embodiment 4 is shown in FIG. 6 similarly to the product registration apparatus 2000 of Example Embodiment 2.

Figure 12:
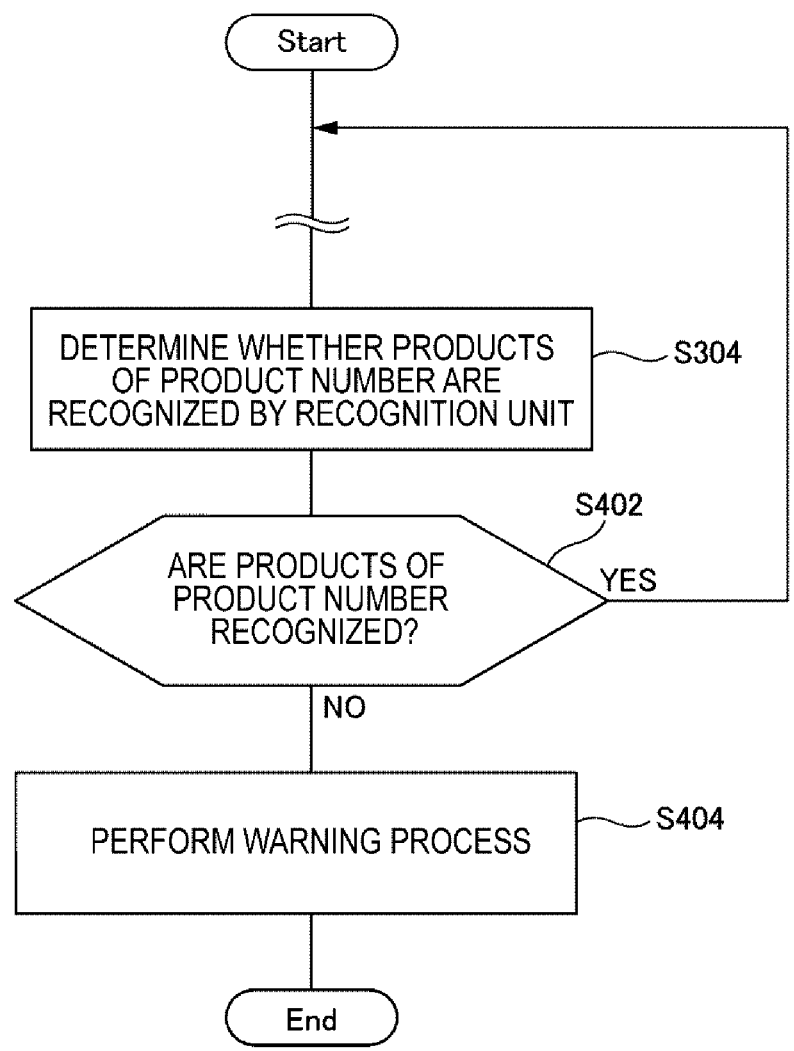
FIG. 12 is a flow diagram illustrating a flow of processes executed by a product registration apparatus of Example Embodiment 4.

The warning unit 2100 of Example Embodiment 4 performs a warning process in a case where it is determined by the determination unit 2080 that "in a case where it is detected that products are disposed within the detection target area, the products of a product number are not recognized by the recognition unit 2020" (S404 of FIG. 12). Regarding other points (such as the contents of a warning process), the warning unit 2100 of Example Embodiment 4 is the same as the warning unit 2100 of Example Embodiment 2.

In addition, the product registration apparatus 2000 of Example Embodiment 4 is the same as the product registration apparatus 2000 of Example Embodiment 3, except that the warning unit 2100 is included therein.

<Flow of Processes>

FIG. 12 is a flow diagram illustrating a flow of processes executed by the product registration apparatus 2000 of Example Embodiment 4. Note that S102 to S108 and S302 to S304 are common to the process performed by the product registration apparatus 2000 of Example Embodiment 4 and the process performed by the product registration apparatus 2000 of Example Embodiment 3. Therefore, in FIG. 12, processes before S304 are not described.

If the products of the product number are recognized in a case where it is detected that products are disposed within the detection target area (S402: YES), the process of FIG. 12 proceeds to S102. On the other hand, if the products of the product number are not recognized in a case where it is detected that products are disposed within the detection target area (S402: NO), the warning unit 2100 perform a warning process (S404).

<Hardware Configuration>

For example, the product registration apparatus 2000 of Example Embodiment 4 is implemented using the computer 1000 of FIG. 5, similarly to the product registration apparatus 2000 of Example Embodiment 3. In the present example embodiment, each program module stored in the storage 1080 further includes a program for realizing each function described in the present example embodiment. In addition, the storage 1080 of the present example embodiment further stores a program module for realizing the warning unit 2100, similarly to the storage 1080 of Example Embodiment 2. The processor 1040 realizes a function of the warning unit 2100 by executing this program module.

<Advantageous Effect>

According to the present example embodiment, the warning process is performed in a situation in which "in a case where it is detected by the detection unit 2060 that products are disposed in the detection target area, the products of the product number are not recognized by the recognition unit 2020". In this manner, since a warning is performed in a case where the mistake in operation or the like described in Example Embodiment 3 occurs, a salesclerk or a customer can clearly recognize the occurrence of such a situation. Thus, a customer can recognize a mistake in operation and thus retry the operation. In addition, it is also possible to take a countermeasure that a salesclerk tell a customer that the product is not recognized.

As described above, although the example embodiments of the present invention have been set forth with reference to the accompanying drawings, the example embodiments are merely illustrative of the present invention, and a combination of the respective example embodiments or various configurations other than those stated above can be adopted.

Hereinafter, examples of reference forms are appended.

1. A product registration apparatus including:
    a recognition unit recognizing a product;
    an imaging unit imaging an action of a customer to generate an image;
    a detection unit using the image generated by the imaging unit to detect that a product is disposed in a detection target area, the detection target area including a recognition area, the recognition area being an area in which the product is recognized by the recognition unit; and
    a determination unit performing a determination process of determining whether or not the recognition unit recognizes a product in a case where the detection unit detects that a product is disposed in the detection target area.

2. The product registration apparatus according to 1, wherein the determination process is a process of determining whether or not the recognition unit recognizes a product within a predetermined time from when the detection unit detects that a product is disposed in the detection target area.

3. The product registration apparatus according to 1, wherein the determination process is a process of determining whether or not the recognition unit recognizes a product after the detection unit detects that a product is disposed in the detection target area and before a product is disposed again in the detection target area by the detection unit.

4. The product registration apparatus according to 1, further including a warning unit performing a warning process in a case where it is determined through the determination process that the recognition unit does not recognize the product after the detection unit detects that a product is disposed in the detection target area.

5. The product registration apparatus according to 1,
    wherein the detection unit determines a number of products disposed in the detection target area, and
    wherein the determination process is a process of determining whether or not the recognition unit recognizes the products of the number of products in a case where the detection unit detects that a product is disposed in the detection target area.

6. The product registration apparatus according to 5, wherein the determination process is a process of determining whether or not the recognition unit recognizes the products of the number of products within a predetermined time from when the detection unit detects that a product is disposed in the detection target area.

7. The product registration apparatus according to 5, wherein the determination process is a process of determining whether or not the recognition unit recognizes the products of the number of products after the detection unit detects that a product is disposed in the detection target area, and before a product is disposed again in the detection target area by the detection unit.

8. The product registration apparatus according to 5, further including a warning unit performing a warning process in a case where the recognition unit does not recognize the products of the number of products are not recognized by after the detection unit detects that a product is disposed in the detection target area.

9. The product registration apparatus according to any one of 1 to 8,
    wherein the recognition unit images the product to generate an image, and
    wherein a resolution of an imaging element of the imaging unit is lower than a resolution of an imaging element of the recognition unit.

10. A program for operating a computer as the product registration apparatus according to any one of 1 to 9.

11. A control method which is executed by a computer, the method including:

a recognition step of recognizing a product;
an imaging step of imaging an action of a customer to generate an image;
a detection step of using the image generated in the imaging step to detect that a product is disposed in a detection target area, the detection target area including a recognition area, the recognition area being an area in which the product is recognized in the recognition step; and
a determination step of performing a determination process of determining whether or not a product is recognized in the recognition step, in a case where it is detected in the detection step that a product is disposed in the detection target area.

12. The control method according to 11, wherein the determination process is a process of determining whether or not the product is recognized in the recognition step within a predetermined time from when it is detected in the detection step that a product is disposed in the detection target area.

13. The control method according to 11, wherein the determination process is a process of determining whether or not a product is recognized in the recognition step after it is detected in the detection step that the product is disposed in the detection target area, and before a product is disposed again in the detection target area in the detection step.

14. The control method according to 11, further including a warning step of performing a warning process in a case where it is determined through the determination process that the product is not recognized in the recognition step after it is detected in the detection step that a product is disposed in the detection target area.

15. The control method according to 11,
wherein the number of products disposed in the detection target area is determined in the detection step, and
the determination process is a process of determining whether or not the products of the number of products are recognized in the recognition step in a case where it is detected in the detection step that a product is disposed in the detection target area.

16. The control method according to 15, wherein the determination process is a process of determining whether or not the products of the number of products are recognized in the recognition step within a predetermined time from when it is detected in the detection step that a product is disposed in the detection target area.

17. The control method according to 15, wherein the determination process is a process of determining whether or not the products of the number of products are recognized in the recognition step after it is detected in the detection step that a product is disposed in the detection target area, and before a product is disposed again in the detection target area in the detection step.

18. The control method according to 15, further including a warning step of performing a warning process in a case where the products of the number of products are not recognized in the recognition step after it is detected in the detection step that a product is disposed in the detection target area.

19. The control method according to any one of 11 to 18,
wherein a product is imaged to generate an image in the recognition step, and
a resolution of an imaging element which is used in the imaging step is lower than a resolution of an imaging element which is used in the recognition step.

This application claims priority from Japanese Patent Application No. 2015-060188 filed on Mar. 23, 2015, the content of which is incorporated herein by reference in its entirety.

The invention claimed is:
1. A product registration apparatus comprising:
at least one hardware processor configured to implement:
a recognition unit recognizing a product;
an imaging unit controlling imaging of an action of a customer to generate an image;
a detection unit using the image generated by the imaging unit to detect that a product is disposed in a detection target area, the detection target area including a recognition area and being wider than the recognition area, the recognition area being an area in which the product is recognized by the recognition unit; and
a determination unit performing a determination process of determining whether or not the recognition unit recognizes a product in a case where the detection unit detects that a product is disposed in the detection target area.

2. The product registration apparatus according to claim 1, wherein the determination process is a process of determining whether or not the recognition unit recognizes a product within a predetermined time from when the detection unit detects that a product is disposed in the detection target area.

3. The product registration apparatus according to claim 1, wherein the determination process is a process of determining whether or not the recognition unit recognizes a product after the detection unit detects that a product is disposed in the detection target area and before the detection unit detects again that a product is disposed in the detection target area.

4. The product registration apparatus according to claim 1, wherein the at least one hardware processor is further configured to implement a warning unit performing a warning process in a case where it is determined through the determination process that the recognition unit does not recognize the product after the detection unit detects that a product is disposed in the detection target area.

5. The product registration apparatus according to claim 1,
wherein the recognition unit images the product to generate an image, and
wherein a resolution of an imaging element of the imaging unit is lower than a resolution of an imaging element of the recognition unit.

6. A non-transitory computer-readable storage medium storing a program for operating a computer as the product registration apparatus according to claim 1.

7. A product registration apparatus comprising:
at least one hardware processor configured to implement:
a recognition unit recognizing a product;
an imaging unit controlling imaging of an action of a customer to generate an image;
a detection unit using the image generated by the imaging unit to detect that a product is disposed in a detection target area, the detection target area including a recognition area, the recognition area being an area in which the product is recognized by the recognition unit; and
a determination unit performing a determination process of determining whether or not the recognition unit recognizes a product in a case where the detection unit detects that a product is disposed in the detection target area,
wherein the detection unit determines a number of products disposed in the detection target area, and
wherein the determination process is a process of determining whether or not the recognition unit recognizes the products of the number of products in a case where the detection unit detects that a product is disposed in the detection target area.

8. The product registration apparatus according to claim 7, wherein the determination process is a process of determining whether or not the recognition unit recognizes the products of the number of products within a predetermined time from when the detection unit detects that a product is disposed in the detection target area.

9. The product registration apparatus according to claim 7, wherein the determination process is a process of determining whether or not the recognition unit recognizes the products of the number of products after the detection unit detects that a product is disposed in the detection target area, and before the detection unit detects again that a product is disposed in the detection target area.

10. The product registration apparatus according to claim 7, wherein the at least one hardware processor is further configured to implement a warning unit performing a warning process in a case where the recognition unit does not recognize the products of the number of products are not recognized by after the detection unit detects that a product is disposed in the detection target area.

11. A non-transitory computer-readable storage medium storing a program for operating a computer as the product registration apparatus according to claim 7.

12. A control method which is executed by a computer, the method comprising:
recognizing a product;
imaging an action of a customer to generate an image;
using the image generated in the imaging to detect that a product is disposed in a detection target area, the detection target area including a recognition area and being wider than the recognition area, the recognition area being an area in which the product is recognized in the recognition; and
performing a determination process of determining whether or not a product is recognized in the recognition, in a case where it is detected in the detection that a product is disposed in the detection target area.

13. A control method which is executed by a computer, the method comprising:
recognizing a product;
imaging an action of a customer to generate an image;
using the image generated in the imaging to detect that a product is disposed in a detection target area, the detection target area including a recognition area, the recognition area being an area in which the product is recognized in the recognition; and
performing a determination process of determining whether or not a product is recognized in the recognition, in a case where it is detected in the detection that a product is disposed in the detection target area,
wherein the determination process includes:
determining a number of products disposed in the detection target area; and
determining, when it is detected that the product is disposed in the detection target area, whether or not a number of the products recognized in the recognition area equals to the determined number of the product disposed in the detection target area.

* * * * *